US012566529B2

(12) United States Patent
Wang et al.

(10) Patent No.: US 12,566,529 B2
(45) Date of Patent: *Mar. 3, 2026

(54) TOUCH ELECTRODE STRUCTURE WITH BRANCH ELECTRODES, TOUCH PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Lingran Wang, Beijing (CN); Jun Yan, Beijing (CN); Zhiliang Jiang, Beijing (CN); Erjin Zhao, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/895,118

(22) Filed: Sep. 24, 2024

(65) Prior Publication Data

US 2025/0013337 A1 Jan. 9, 2025

Related U.S. Application Data

(63) Continuation of application No. 17/921,093, filed as application No. PCT/CN2021/126519 on Oct. 26, 2021, now Pat. No. 12,159,014.

(30) Foreign Application Priority Data

Apr. 29, 2021 (CN) .......................... 202110476493.6

(51) Int. Cl.
G06F 3/044 (2006.01)
G06F 3/041 (2006.01)

(52) U.S. Cl.
CPC .......... G06F 3/0448 (2019.05); G06F 3/0412 (2013.01); G06F 3/0445 (2019.05); G06F 3/0446 (2019.05); G06F 2203/04111 (2013.01)

(58) Field of Classification Search
CPC .... G06F 3/0412; G06F 3/0443; G06F 3/0445; G06F 3/0446; G06F 3/0448; G06F 2203/04111; G06F 2203/04112
See application file for complete search history.

(56) References Cited

U.S. PATENT DOCUMENTS 12,159,014 B2 * 12/2024 Wang ..................... G06F 3/0448
2014/0347299 A1 * 11/2014 Lu .......................... G06F 3/0446
345/173

(Continued)

*Primary Examiner* — Liliana Cerullo
(74) *Attorney, Agent, or Firm* — IPro, PLLC

(57) ABSTRACT

Provided is a touch electrode structure. The touch electrode structure includes a plurality of touch electrode patterns, wherein each of the touch electrode patterns includes a first touch electrode and a second touch electrode, and the first touch electrodes and second touch electrodes of touch electrode patterns of the touch electrode structure are insulated. Branch electrodes of the first touch electrode and branch electrodes of the second touch electrode are disposed in at least one of a first region defined by first main body electrodes of two first touch electrodes and a second region defined by second main body electrodes of two second touch electrodes.

19 Claims, 10 Drawing Sheets

(56)  References Cited

U.S. PATENT DOCUMENTS

| | | | |
|---|---|---|---|
| 2015/0370369 A1* | 12/2015 | Kuo ..................... | G06F 3/0443 |
| | | | 345/174 |
| 2018/0224968 A1* | 8/2018 | Church ................ | G06F 3/0448 |
| 2022/0155902 A1* | 5/2022 | Chuang .............. | G06F 3/04164 |
| 2023/0214069 A1* | 7/2023 | Wang .................... | H10K 59/40 |

* cited by examiner

First touch electrode

Second touch electrode

Middle region

Edge region

1011

104

102

103 b1          b3          b2

1012

1013

10123

10111
10112a
1011
10112
10112b 10122a
10122b
10122

10121

1012

10124

C f g

D

X

Y

101

1011

1012

1013

1013    h    10122b    10112b

1013 b11          10114          b12 h e

01

10
20

01

02

TOUCH ELECTRODE STRUCTURE WITH BRANCH ELECTRODES, TOUCH PANEL AND DISPLAY DEVICE

CROSS-REFERENCE TO RELATED APPLICATION

This application is a continuation application of U.S. application Ser. No. 17/921,093, filed on Oct. 24, 2022 and claims priority to Chinese Patent Application No. 202110476493.6, filed on Apr. 29, 2021 and entitled "TOUCH ELECTRODE STRUCTURE, TOUCH PANEL AND DISPLAY DEVICE," the disclosures of which are incorporated herein by reference in their entireties.

TECHNICAL FIELD

The present disclosure relates to the field of touch technologies, and in particular, to a touch electrode structure, a touch panel, and a display device.

BACKGROUND

The touch panel includes a display substrate, a touch electrode structure disposed on the display substrate, and a detection circuit electrically connected to the touch electrode structure. The touch electrode structure includes a plurality of touch electrode patterns. When a user's finger approaches the touch electrode structure, the detection circuit detects that an induction amount of the touch electrode pattern at the position of the user's finger changes, and determines the position where the induction amount changes as a touch position.

SUMMARY

The present disclosure provides a touch electrode structure, a touch panel, and a display device. The technical solutions are as follows:

According to some embodiments of the present disclosure, a touch electrode structure is provided. The touch electrode structure includes: a plurality of touch electrode patterns, wherein each of the touch electrode pattern includes:

a first touch electrode, including a first main body electrode and branch electrodes electrically connected to the first main body electrode, wherein the first main body electrode of each of the touch electrode patterns includes a first part and a second part which are arranged in a first direction; and a second touch electrode, insulated from the first touch electrode, and including a second main body electrode and branch electrodes electrically connected to the second main body electrode, wherein the second main body electrode of each of the touch electrode patterns includes a third part and a fourth part which are arranged in a second direction, the second direction being intersected with the first direction;

wherein in the two touch electrode patterns adjacent to each other in the first direction, the first part of the first main body electrode of one touch electrode pattern and the second part of the first main body electrode of the other touch electrode pattern define a first region; in the two touch electrode patterns adjacent to each other in the second direction, the third part of the second main body electrode of the second touch electrode of one touch electrode pattern and the fourth part of the second main body electrode of the second touch electrode of the other touch electrode pattern define a second region; and at least one of the first region and the second region includes the branch electrodes of the first touch electrode and the branch electrodes of the second touch electrode, and a gap is defined between each of the branch electrodes of the first touch electrode and each of the branch electrodes of the second touch electrode which are disposed in the same region.

In some embodiments, the branch electrodes of the first touch electrode include first branch electrodes, and the branch electrodes of the second touch electrode include second branch electrodes;

wherein the first branch electrodes and the second branch electrodes are disposed in the first region, and a gap is defined between each of the first branch electrodes and each of the second branch electrodes.

In some embodiments, an extending direction of at least part of at least one boundary of the first branch electrode is parallel to an extending direction of at least part of at least one boundary of the second branch electrode.

In some embodiments, the second touch electrode further includes a first connection electrode and a second connection electrode which are disposed in the same layer as the second branch electrodes;

the first connection electrode is disposed in the first region and is electrically connected to the second branch electrodes; and one terminal of the second connection electrode is electrically connected to the second branch electrodes, and the other terminal of the second connection electrode is electrically connected to the second main body electrode.

In some embodiments, the second main body electrode further includes a bridge part; the first touch electrode, the third part, the fourth part and the second branch electrodes are disposed in the same layer; and the touch electrode structure further includes: an insulating layer, wherein the insulating layer is provided with vias; and the bridge part and the third part are disposed in different layers, one terminal of the bridge part is electrically connected to the third part by the via, and the other terminal of the bridge part is electrically connected to the fourth part by the via.

In some embodiments, the other terminal of the second connection electrode is electrically connected to the third part or the fourth part by the bridge part.

In some embodiments, the branch electrodes of the first touch electrode include third branch electrodes, and the branch electrodes of the second touch electrode include fourth branch electrodes;

wherein the third branch electrodes and the fourth branch electrodes are disposed in the second region, and a gap is defined between each of the third branch electrodes and each of the fourth branch electrodes.

In some embodiments, an extending direction of at least part of at least one boundary of the third branch electrode is parallel to an extending direction of at least part of at least one boundary of the fourth branch electrode.

In some embodiments, the first touch electrode further includes a third connection electrode and a fourth connection electrode;

wherein the third connection electrode is disposed in the second region and is electrically connected to the third branch electrodes; and one terminal of the fourth connection electrode is electrically connected to the third branch electrodes, and the other terminal of the fourth connection electrode is electrically connected to the first main body electrode.

In some embodiments, each of the third part and the fourth part includes a first subpart and a second subpart, a gap being defined between the first subpart and the second subpart; and at least part of the fourth connection electrode is disposed within the gap between the first subpart and the second subpart.

In some embodiments, one side, close to the second main body electrode, of the first main body electrode is provided with a plurality of first protrusive structures, and one side, close to the first main body electrode, of the second main body electrode is provided with a plurality of second protrusive structures; and the plurality of first protrusive structures and the plurality of second protrusive structures are alternately arranged, and a gap is defined between the first protrusive structure and the second protrusive structure which are adjacent to each other.

In some embodiments, each of the touch electrode patterns further includes a floating electrode disposed in the same layer as the first touch electrode; and the floating electrode is insulated from both the first touch electrode and the second touch electrode.

In some embodiments, the branch electrodes of the first touch electrode, the first part, the second part, the branch electrodes of the second touch electrode, the third part, and the fourth part are all grid-like structures.

In some embodiments, grid lines of the grid-like structure are provided with at least one fracture.

According to some embodiments of the present disclosure, a touch panel is provided. The touch panel includes a display substrate and at least one touch electrode structure according to the above aspect, wherein the touch electrode structure is disposed on the display substrate.

According to some embodiments of the present disclosure, a display device is provided. The display device includes a power supply assembly and the touch panel according to the above aspect;

wherein the power supply assembly is configured to supply power to the touch panel.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, some embodiments of the present disclosure are described in detail hereinafter with reference to the accompanying drawings.

With the rapid development of organic light-emitting diode (OLED) display panels, mobile terminals have entered the era of full screens and folding screens. In order to bring a better experience to users, the full screens, narrow-border screens, high-resolution screens and the folding screens will surely become an important development direction of the OLED display panels in the future. In order to make the display panel lighter and thinner to accommodate folded and rolled products, a flexible multi-layer on cell (FMLOC) technology was born. Moreover, with the continuous development of information technologies, higher and higher requirements are set forth on touch performances of touch panels.

Figure 1:
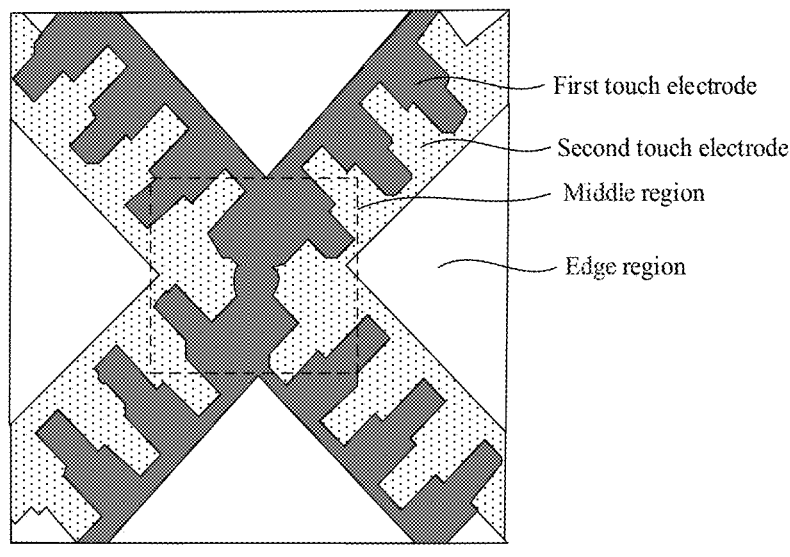
FIG. 1 is a schematic diagram of a touch electrode pattern in a touch panel in related art.

FIG. 1 is a schematic diagram of a touch electrode pattern in a touch panel in related art. Referring to FIG. 1, the touch electrode pattern in the related art includes a first touch electrode and a second touch electrode which are insulated from each other. A middle region of the touch electrode pattern is provided with both the first touch electrode and the second touch electrode, and an edge region of the touch electrode pattern is only provided with the first touch electrode or is only provided with the second touch electrode. That is, the touch electrode pattern has a greater mutual capacitance in the middle region and a less mutual capacitance in the edge region.

When a user's finger approaches the edge region of the touch electrode pattern, since the change of an induction amount of the touch electrode pattern is less (that is, the touch performances of the edge region of the touch electrode pattern are poor), a detection circuit is incapable of accurately determining a touch position base on the less change in the induction amount.

Moreover, when the user's finger approaches the middle region of the touch electrode pattern, the induction amount of the touch electrode pattern changes greatly (that is, the touch performances of the middle region of the touch electrode pattern are better). The difference in the touch performances between the middle region and the edge region of the touch electrode pattern is greater, and touch linearity of the touch electrode pattern is poor.

The terms used in the section of detailed description of the present disclosure are merely for the purpose of explaining some embodiments of the present disclosure, and are not intended to limit the present disclosure. Unless otherwise defined, the technical terms or scientific terms used in some embodiments of the present disclosure shall be taken to mean the ordinary meanings as understood by the ordinary skill in the art to which the present disclosure belongs. The terms "first," "second," "third," and similar terms used in the description and claims of the present disclosure do not denote any order, number, or importance, but are merely configured to distinguish different components. Similarly, the singular forms "an," "a," and "the" are not intended to limit the number but include both singular and plural referents. The term "include" or "contain" and similar terms are intended to mean that the elements or objects before "include" or "contain" cover the elements or objects or equivalents listed after "include" or "contain," without excluding other elements or objects. The term "connection" or "connected" and similar terms are not limited to physical or mechanical connection, and may include electrical connection and the connection may be direct or indirect. The terms "upper," "lower," "left," "right," and the like only indicate the relative positional relationship, and when the absolute position of a described object changes, the relative positional relationship may also change accordingly.

Figure 2:
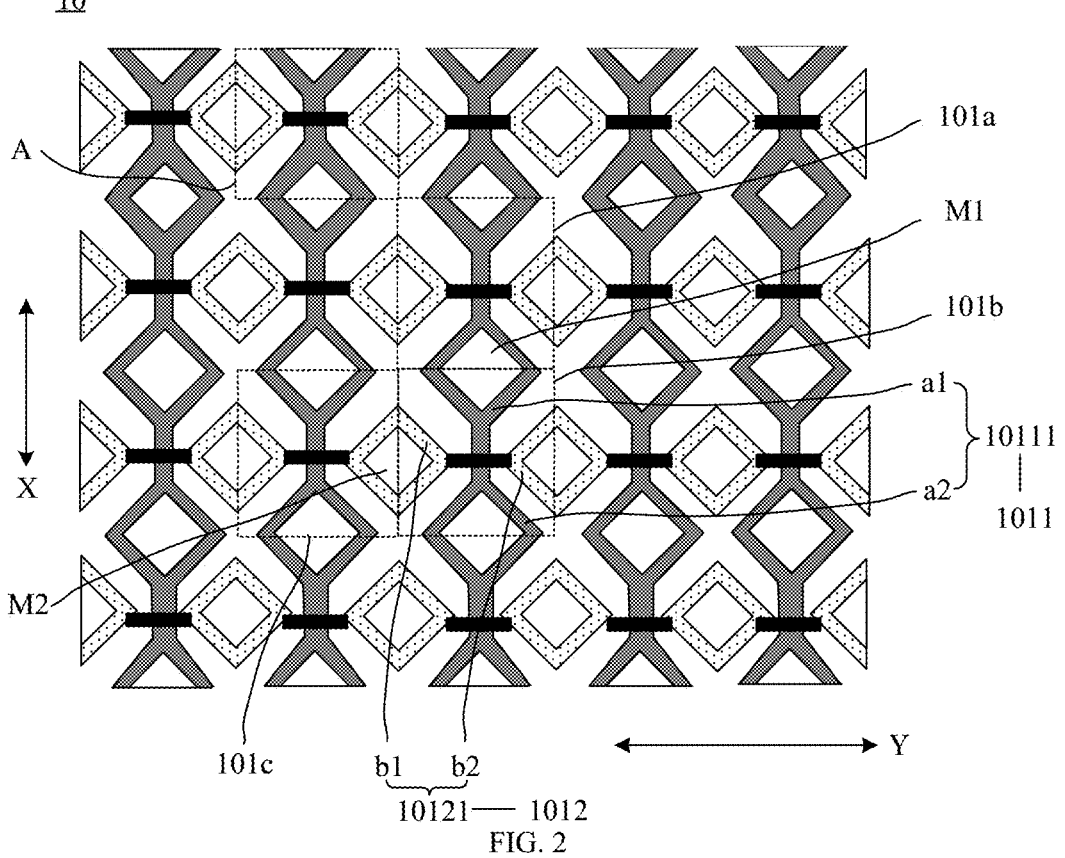
FIG. 2 is a schematic structural diagram of a touch electrode structure according to some embodiments of the present disclosure.
Figures 3, 4:
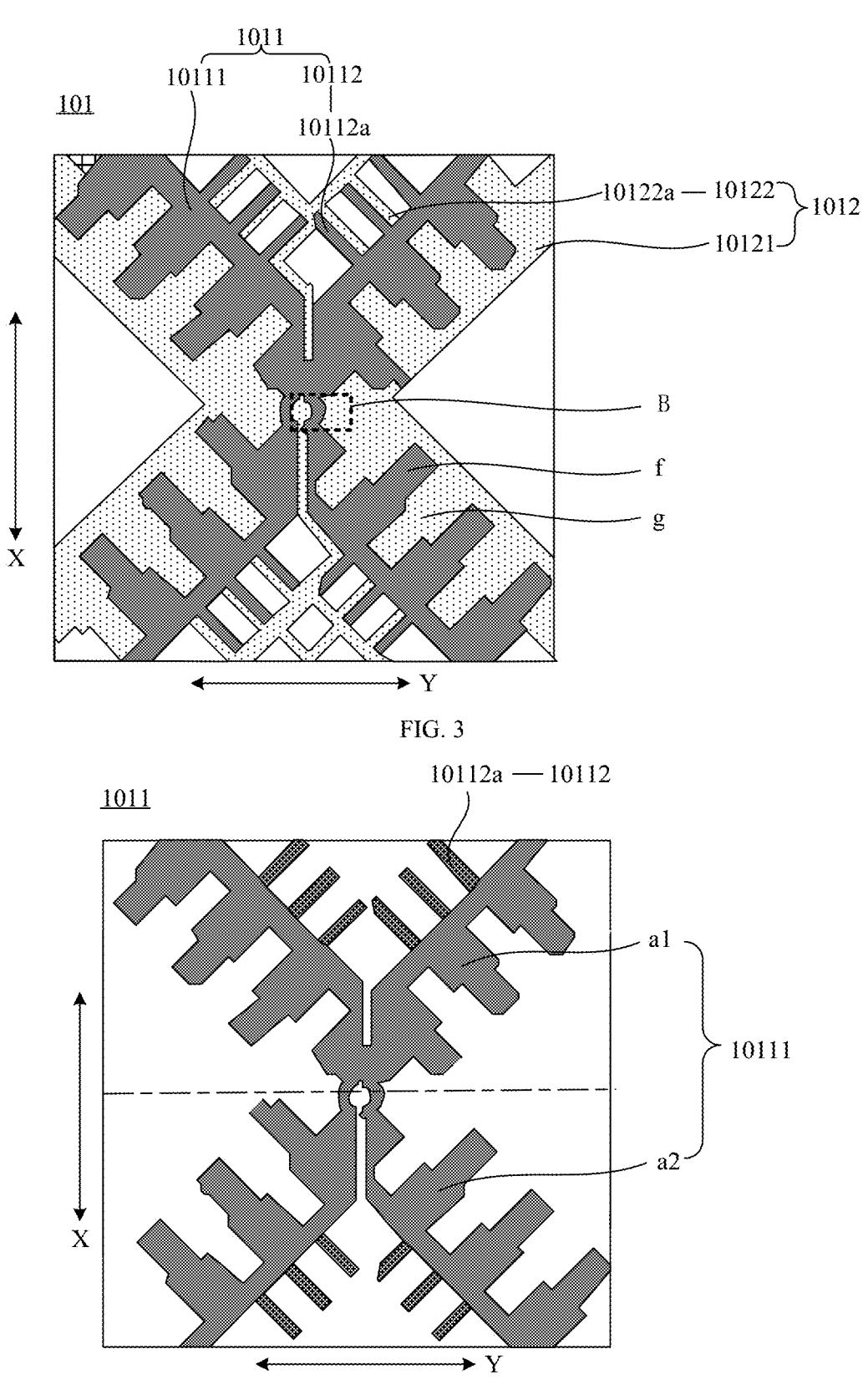
FIG. 3 is a partial schematic diagram of region A in FIG. 2.
FIG. 4 is a schematic structural diagram of a first touch electrode according to some embodiments of the present disclosure.

FIG. 2 is a schematic structural diagram of a touch electrode structure according to some embodiments of the present disclosure. FIG. 3 is a partial schematic diagram of region A in FIG. 2. The structure shown in the region A is a touch electrode pattern. Referring to FIG. 2, the touch electrode structure 10 includes a plurality of touch electrode patterns 101. For example, 20 touch electrode patterns 101 are shown in FIG. 2.

Referring to FIG. 2 and FIG. 3, each of the touch electrode patterns 101 includes a first touch electrode 1011 and a second touch electrode 1012. The first touch electrode 1011 and the second touch electrode 1012 are insulated from each other. Therefore, a signal transmitted in the first touch electrode 1011 is different from a signal transmitted in the second touch electrode 1012.

FIG. 4 is a schematic structural diagram of a first touch electrode according to some embodiments of the present disclosure. Referring to FIG. 3 and FIG. 4, the first touch electrode 1011 includes a first main body electrode 10111 and branch electrodes 10112 electrically connected to the first main body electrode 10111.

Figure 5:
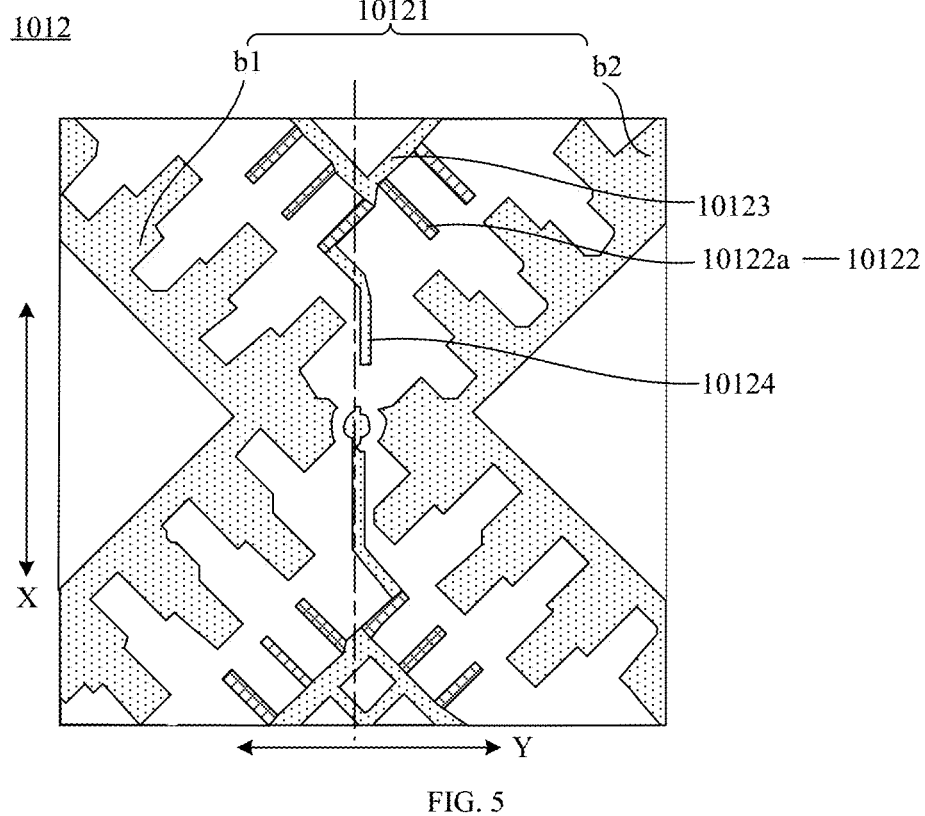
FIG. 5 is a schematic structural diagram of a second touch electrode according to some embodiments of the present disclosure.

FIG. 5 is a schematic structural diagram of a second touch electrode according to some embodiments of the present disclosure. Referring to FIG. 3 and FIG. 5, the second touch electrode 1012 includes a second main body electrode 10121 and branch electrodes 10122 electrically connected to the second main body electrode 10121.

In combination with FIG. 2 to FIG. 4, the first main body electrode 10111 of the first touch electrode 1011 of each of the touch electrode patterns 101 includes: a first part a1 and a second part a2 which are arranged in a first direction X. In addition, in two touch electrode patterns 101 adjacent to each other in the first direction X (for example, 101a and 101b in FIG. 2), the first part a1 of the first main body electrode 10111 of one touch electrode pattern 101b and the second part a2 of the first main body electrode 10111 of the other touch electrode pattern 101a define a first region M1.

In combination with FIG. 2 to FIG. 5, the second main body electrode 10121 of the second touch electrode 1012 of each of the touch electrode patterns 101 includes a third part b1 and a fourth part b2 which are arranged in a second direction Y. In addition, in two touch electrode patterns 101 adjacent to each other in the second direction Y (for example, 101b and 101c in FIG. 1), the third part b1 of the second main body electrode 10121 of one touch electrode pattern 101b and the fourth part b2 of the second main body electrode 10121 of the other touch electrode pattern 101c define a second region M2.

In some embodiments of the present disclosure, at least one of the first region M1 and the second region M2 includes the branch electrodes 10112 of the first touch electrode 1011 and the branch electrodes 10122 of the second touch electrode 1012. In addition, a gap is defined between each of the branch electrodes 10112 of the first touch electrode 1011 and each of the branch electrodes 10122 of the second touch electrode 1012 which are disposed in the same region (the gaps are not shown in FIG. 2 to FIG. 5).

Since the branch electrodes 10112 of the first touch electrode 1011 and the branch electrodes 10122 of the second touch electrode 1012 are disposed in at least one of the first region M1 and the second region M2, that is, the at least one region is provided with the electrodes of two signals, the mutual capacitance of the at least one region is greater. By forming the gaps between the branch electrodes 10112 of the first touch electrode 1011 and the branch electrodes 10122 of the second touch electrode 1012, the branch electrodes 10112 of the first touch electrode 1011 and the branch electrodes 10122 of the second touch electrode 1012 are prevented from being short-circuited due to contact, thereby ensuring that the first touch electrode 1011 and the second touch electrode 1012 are insulated. Therefore, when the user's finger approaches at least one region having the branch electrodes 10112 of the first touch electrode 1011 and the branch electrodes 10122 of the second touch electrode 1012, the change of the induction amount of the at least one region is greater, which is convenient for the detection circuit to accurately determine the touch position.

In summary, some embodiments of the present disclosure provide a touch electrode structure. The first touch electrodes and the second touch electrodes of the touch electrode patterns of the touch electrode structure are insulated. The branch electrodes of the first touch electrode and the branch electrodes of the second touch electrode are disposed in at least one of the first region defined by the first main body electrodes of two first touch electrodes and the second region defined by the second main body electrodes of two second touch electrodes, such that the mutual capacitance of the at least one region is greater. When the user's finger approaches the at least one region, the induction amount of the touch electrode pattern changes greatly, such that the detection circuit accurately determines the touch position of the user's finger based on the greater change in the induction amount, and the touch performance of the touch panel is better.

In some embodiments of the present disclosure, the mutual capacitance of at least one region with the branch electrodes 10121 of the first touch electrode 1011 and the branch electrodes 10122 of the second touch electrode 1012 is greater, which reduces the difference between the mutual capacitance of the at least one region and the mutual capacitance of the regions where the first main body electrode 10111 and the second main body electrode 10121 in the touch electrode pattern 101 are disposed, and the touch linearity of the touch electrode pattern 101 is better.

Optionally, a width of the gaps between the branch electrodes 10121 of the first touch electrode 1011 and the branch electrodes 10122 of the second touch electrode 1012 in the same region ranges from 4 μm to 6 μm, for example, 5.2 μm.

Since the gaps between the branch electrodes 10112 of the first touch electrode 1011 and the branch electrodes 10122 of the second touch electrode 1012 are smaller, a mutual capacitance is ensured between the branch electrodes 10112 of the first touch electrode 1011 and the branch electrodes 10122 of the second touch electrode 1012.

In some embodiments of the present disclosure, in combination with FIG. 2 to FIG. 5, the branch electrodes 10112 of the first touch electrode 1011 include first branch electrodes 10112a. The branch electrodes 10122 of the second touch electrode 1012 include second branch electrodes 10122a. The first branch electrodes 10112a and the second branch electrodes 10122a are all disposed in the first region M1. A gap is defined between each of the first branch electrodes 10112a and each of the second branch electrodes 10122a (the gaps are not shown in FIG. 2 to FIG. 5), and the widths of the gaps between the first branch electrodes 10112a and the second branch electrodes 10122a range from 4 μm to 6 μm, for example, 5.2 μm.

Since the first branch electrodes 10112a of the first touch electrode 1011 and the second branch electrodes 10122a of the second touch electrode 1012 are disposed in the first region M1, that is, the first region M1 is provided with the electrodes of two signals, the mutual capacitance of the region M1 is greater. By forming the gaps between the first branch electrodes 10112a and the second branch electrodes 10122a, the first branch electrodes 10112a and the second branch electrodes 10122a are prevented from being short-circuited due to contact, thereby ensuring that the first touch electrode 1011 and the second touch control electrode 1012 are insulated. Moreover, since the gaps between the first branch electrodes 10112a and the second branch electrodes 10122a are smaller, a mutual capacitance is ensured between the first branch electrodes 10112a and the second branch electrodes 10122a. Therefore, when the user's finger approaches the first region M1 with the first branch electrodes 10112a and the second branch electrodes 10122a, the change of the induction amount of the first region M1 is greater, which is convenient for the detection circuit to accurately determine the touch position.

In some embodiments of the present disclosure, the mutual capacitance of the first region M1 is greater, which reduces the difference between the mutual capacitance of the first region M1 and the mutual capacitance of the regions where the first main body electrode 10111 and the second main body electrode 10121 in the touch electrode pattern 101 are disposed. The touch linearity of the touch electrode pattern 101 is better.

Optionally, referring to FIG. 2, the plurality of touch electrode patterns 101 included in the touch electrode structure 10 are arranged in an array. For example, the 20 touch electrode patterns 101 shown in FIG. 2 are arranged in 4 rows and 5 columns. The touch electrode structure 10 in FIG. 2 includes five columns of first touch electrodes 1011 and four rows of second touch electrodes 1012.

Optionally, the first touch electrode 1011 is a driving (Tx) electrode, and the second touch electrode 1012 is a sensing (Rx) electrode. Alternatively, the first touch electrode 1011 is a sensing electrode, and the second touch electrode 1012 is a driving electrode. Some embodiments of the present disclosure do not limit the types of the first touch electrode 1011 and the second touch electrode 1012 as long as one of the first touch electrode 1011 and the second touch electrode 1012 is the driving electrode and the other of the first touch electrode 1011 and the second touch electrode 1012 is the sensing electrode.

In some embodiments of the present disclosure, an extending direction of at least part of at least one boundary of the first branch electrode 10112a is parallel to an extending direction of at least part of at least one boundary of the second branch electrode 10122a, such that a capacitance is generated between the first branch electrode 10122a and the second branch electrode 10122a, thereby increasing the mutual capacitance of the first region M1.

Exemplarily, in combination with FIG. 3 to FIG. 5, the first branch electrode 10112a and the second branch electrode 10122a are both strip electrodes, and the extending direction of the first branch electrode 10112a and the extending direction of the second branch electrode 10122a are parallel. By making the extending direction of the first branch electrode 10112a and the extending direction of the second branch electrode 10122a parallel, it is convenient to generate the capacitance between the first branch electrode 10112a and the second branch electrode 10122a, thereby improving the mutual capacitance of the first region M1.

The first branch electrode 10112a and the second branch electrode 10122a are also electrodes of other shapes, such as a triangle, a rectangle and a hexagon. Some embodiments of the present disclosure do not limit the shapes of the first branch electrode 1011a and the second branch electrode 10122a.

Figure 6:
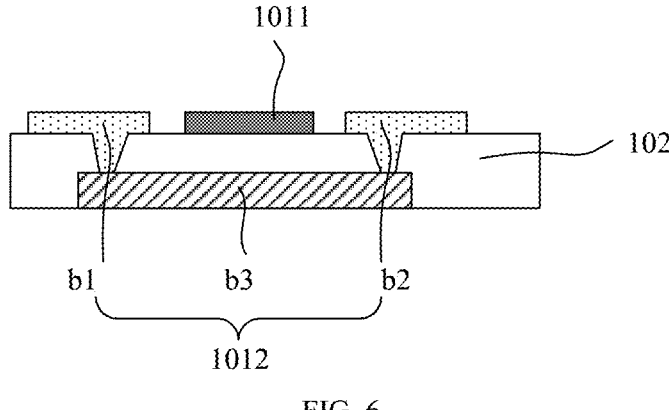
FIG. 6 is a partial cross-sectional schematic diagram of region B in FIG. 3.

FIG. 6 is a schematic partial cross-sectional view of region B in FIG. 3. Referring to FIG. 3 and FIG. 6, the second main body electrode 10121 further includes a bridge part b3.

In some embodiments of the present disclosure, the first touch electrode 1011 (the first part a1 and the second part a2 of the first main body electrode 10111 and the first branch electrodes 10112a), the third part b1 and the fourth part b2 of the second main body electrode 10121 of the second touch electrode 1012 and the second branch electrodes 10122a of the second touch electrode 1012 are disposed in the same layer. In addition, the bridge part b3 and the third part b1 of the second main body electrode 10121 of the second touch electrode 1012 are disposed in different layers.

Optionally, in order to insulate the second touch electrode 1012 from the first touch electrode 1011, a gap needs to be formed between the third part b1 and the first main body electrode 10111 which are disposed in the same layer, and a gap needs to be formed between the third part b1 and the fourth part b2 which are disposed in the same layer and the first main body electrode 10111.

Referring to FIG. 6, the touch electrode structure 10 further includes an insulating layer 102. The insulating layer 102 is provided with vias. The bridge part b3 is disposed on one side of the insulating layer 102, and the third part b1 and the fourth part b2 are disposed on the other side of the insulating layer 102. One terminal of the bridge part b3 is electrically connected to the third part b1 by the via in the insulating layer 102, and the other terminal of the bridge part b3 is electrically connected to the fourth part b2 by the via in the insulating layer 102, thereby realizing electrical connection of the bridge part b3, the third part b1 and the fourth part b2.

Since the first touch electrode 1011 and the second touch electrode 1012 have an overlapping region, in order to ensure effective transmission of signals of the first touch electrode 1011 and the second touch electrode 1012 under the premise of ensuring the insulation of the first touch electrode 1011 and the second touch electrode 1012, the third part b1 and the fourth part b2 spaced apart are electrically connected by the bridge part b3. An orthogonal projection of the bridge part b3 on the insulating layer 102 at least partially overlaps with an orthogonal projection of the first touch electrode 1011 on the insulating layer 102.

Referring to FIG. 5, the second touch electrode 1012 further includes a first connection electrode 10123 disposed in the same layer as the second branch electrodes 10122a. The first connection electrode 10123 is disposed in the first region M1 and electrically connected to the second branch electrodes 10122a. Exemplarily, for each first region M1, the first connection electrode 10123 is electrically connected to all the second branch electrodes 10122a in the first region M1, such that signals of all the second branch electrodes 10122a in the first region M1 are connected.

Besides, referring to FIG. 5, the second touch electrode 1012 further includes a second connection electrode 10124 disposed in the same layer as the second branch electrodes 10122a. One terminal of the second connection electrode 10124 is electrically connected to the second branch electrodes 10122a, and the other terminal of the second connection electrode is electrically connected to the second main body electrode 10121.

Since the second branch electrodes 10122a are disposed in the first region M1, and the second main body electrode 10121 is disposed outside the first region M1, in order to prevent the second connection electrode 10124 and the first touch electrode 1011 from being short-circuited due to contact, the other terminal of the second connection electrode 10124 is electrically connected to the bridge part b3 by the via in the insulating layer 102. In addition, the bridge part b3 is also electrically connected to the third part b1 and the fourth part b2. That is, the second connection electrode 10124 is electrically connected to the third part b1 or the fourth part b2 by the bridge part b3.

Therefore, In some embodiments of the present disclosure, by disposing the first connection electrode 10123 and the second connection electrode 10124 in the second touch electrode 1012, electrical connection between the second branch electrodes 10122a and the second main body electrode 10121 is achieved, thereby ensuring effective signal transmission.

In some embodiments of the present disclosure, for the schematic diagram of electrical connection between the other terminal of the second connection electrode 10124 and the third part b1 and the fourth part b2 by the bridge part b3, reference may be made to FIG. 6 above. For example, by replacing the third part b1 in FIG. 6 with the second connection electrode 10124, the schematic diagram of electrical connection between the second connection electrode 10124 and the fourth part b2 by the bridge part b3 is obtained. Alternatively, by replacing the fourth part b2 in FIG. 6 with the second connection electrode 10124, the schematic diagram of electrical connection between the second connection electrode 10124 and the third part b1 by the bridge part b3 is obtained.

Figures 7, 8:
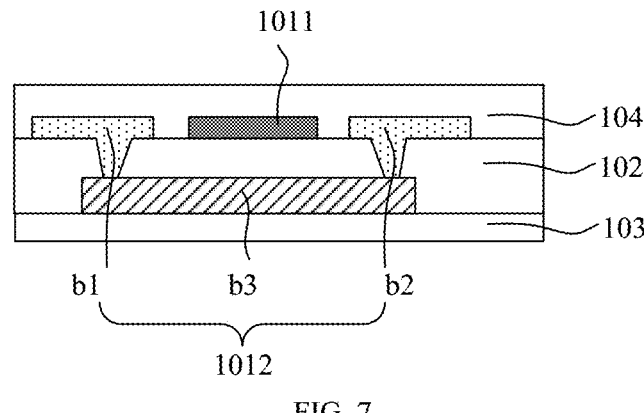
FIG. 7 is another partial cross-sectional schematic diagram of the region B in FIG. 3.
FIG. 8 is another partial schematic diagram of the region A in FIG. 2.

Optionally, referring to FIG. 7, the touch electrode structure 10 further includes an insulating layer 103 disposed on one side, away from the third part b1, of the bridge part b3, and an insulating layer 104 disposed on one side, away from the bridge part b3, of the third part b1. The insulating layer 103 disposed on the side, away from the third part b1, of the bridge part b3 includes a buffer layer. The insulating layer 103 disposed on the side, away from the bridge part b3, of the third part b1 includes a flat layer.

Figure 9:
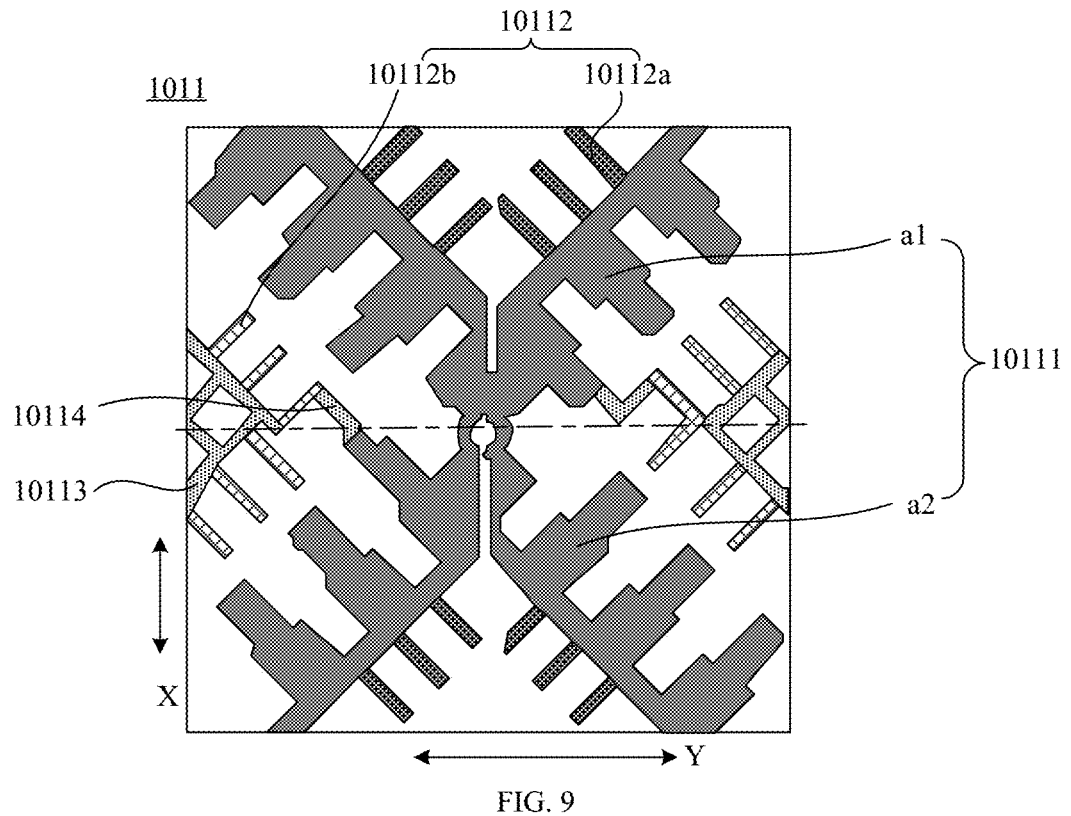
FIG. 9 is a schematic structural diagram of another first touch electrode according to some embodiments of the present disclosure.
Figures 10, 11:
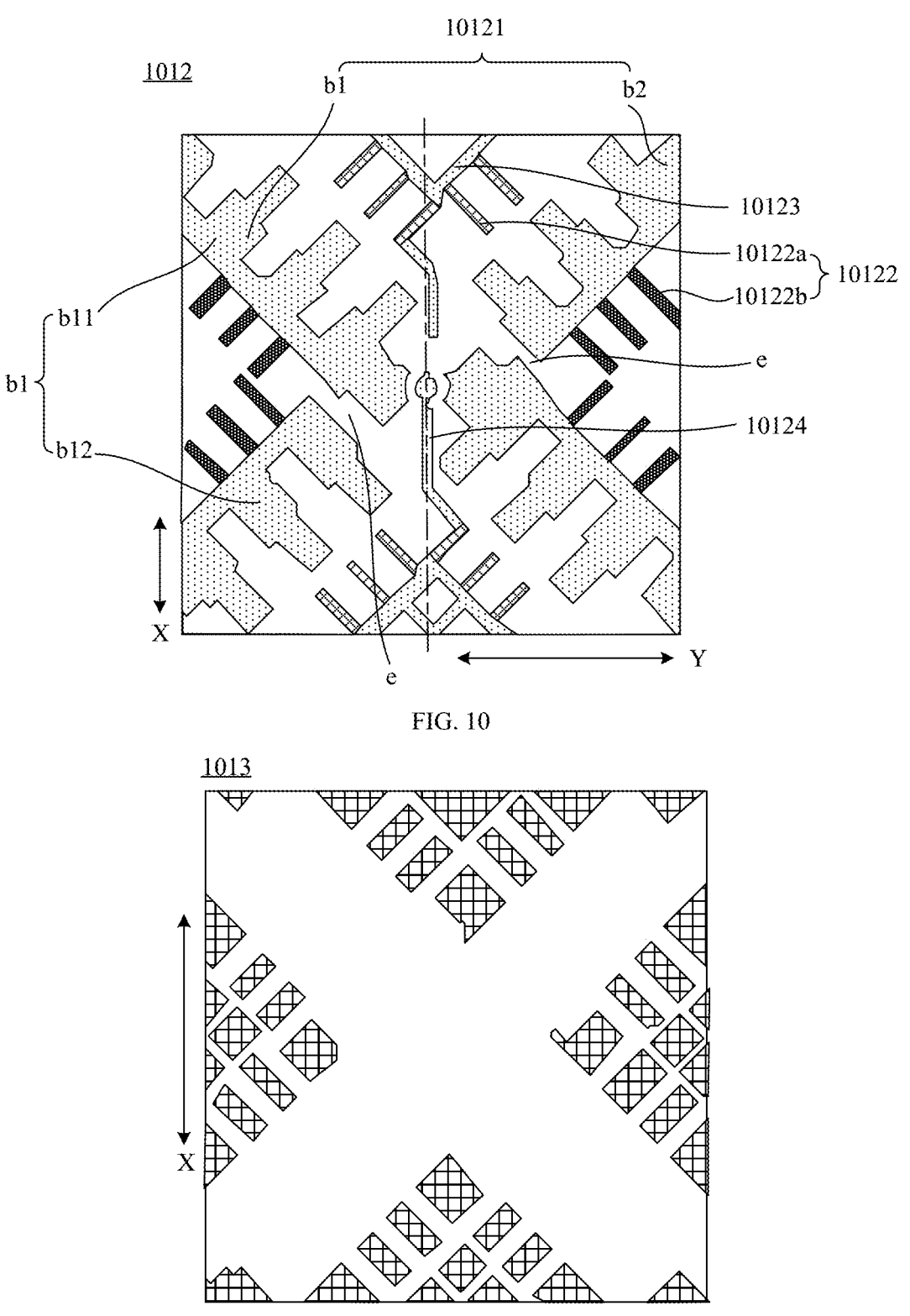
FIG. 10 is a schematic structural diagram of another second touch electrode according to some embodiments of the present disclosure.
FIG. 11 is a schematic structural diagram of a floating electrode according to some embodiments of the present disclosure.

FIG. 8 is another partial schematic diagram of the region A in FIG. 2. FIG. 9 is a schematic structural diagram of another first touch electrode according to some embodiments of the present disclosure. FIG. 10 is a schematic structural diagram of another second touch electrode according to some embodiments of the present disclosure. FIG. 11 is a schematic structural diagram of a floating electrode according to some embodiments of the present disclosure. In combination with FIG. 8 to FIG. 11, the branch electrodes 10112 of the first touch electrode 1011 further include third branch electrodes 10112b. The branch electrodes 10122 of the second touch electrode 1012 further include fourth branch electrodes 10122b.

The third branch electrodes 10112b and the fourth branch electrodes 10122b are both disposed in the second region M2, and a gap is defined between each of the third branch electrodes 10112b and each of the fourth branch electrodes 10122b (the gaps are not shown in FIG. 8 to FIG. 11). The widths of the gaps between the third branch electrodes 10112b and the fourth branch electrodes 10122b range from 4 μm to 6 μm, for example, 5.2 μm.

Since the third branch electrodes 10112b of the first touch electrode 1011 and the fourth branch electrodes 10122b of the second touch electrode 1012 are disposed in the second region M2, that is, the second region M2 are provided with the electrodes of two signals, the mutual capacitance of the second region M2 is greater. By forming the gaps between the third branch electrodes 10112b and the fourth branch electrodes 10122b, the third branch electrodes 10112b and the fourth branch electrodes 10122b are prevented from being short-circuited due to contact, thereby ensuring that the first touch electrode 1011 and the second touch electrode 1012 are insulated. In addition, since the gaps between the third branch electrodes 10112b and the fourth branch electrodes 10122b are smaller, a mutual capacitance is ensured between the third branch electrodes 10112b and the fourth branch electrodes 10122b. When the user's finger approaches the second region M2 with the third branch electrodes 10112b and the fourth branch electrodes 10122b, the change of the induction amount of the second region M2 is greater, which is convenient for the detection circuit to accurately determine the touch position.

Therefore, In some embodiments of the present disclosure, the mutual capacitance of the first region M1 and the second region M2 is greater, which reduces the difference between the mutual capacitance of the first region M1 and the second region M2 and the mutual capacitance of other regions in the touch electrode pattern 101. The touch linearity of the touch electrode pattern 101 is enhanced.

In some embodiments of the present disclosure, an extending direction of at least part of at least one boundary of the third branch electrode 10112b is parallel to an extending direction of at least part of at least one boundary of the fourth branch electrode 10122b, such that a capacitance is generated between the third branch electrode 10112*b* and the fourth branch electrode 10122*b*, thereby increasing the mutual capacitance of the second region M2.

Exemplarily, referring to FIG. 8 to FIG. 10, the third branch electrode 10112*b* and the fourth branch electrode 10122*b* are both strip electrodes, and the extending direction of the third branch electrode 10112*b* and the extending direction of the fourth branch electrode 10122*b* are parallel. By making the extending direction of the third branch electrode 10112*b* and the extending direction of the fourth branch electrode 10122*b* parallel, it is convenient to generate the capacitance between the third branch electrode 10112*b* and the fourth branch electrode 10122*b*, thereby improving the mutual capacitance of the second region M2.

The third branch electrode 10112*b* and the fourth branch electrode 10122*b* are also electrodes of other shapes, such as a triangle, a rectangle, and a hexagon. Some embodiments of the present disclosure do not limit the shapes of the third branch electrode 10112*b* and the fourth branch electrode 10122*b*.

Referring to FIG. 9, the first touch electrode 1011 further includes a third connection electrode 10113. The third connection electrode 10113 is disposed in the second region M2 and is electrically connected to the third branch electrodes 10112*b*. Exemplarily, for each second region M2, the third connection electrode 10113 is electrically connected to all the third branch electrodes 10112*b* disposed in the second region M2, such that signals of all the third branch electrodes 10112*b* in the second region M2 are connected.

Besides, referring to FIG. 9, the first touch electrode 1011 further includes a fourth connection electrode 10114. One terminal of the fourth connection electrode 10114 is electrically connected to the third branch electrodes 10112*b*, and the other terminal of the fourth connection electrode is electrically connected to the first main body electrode 10111.

In some embodiments of the present disclosure, the third part b1 of the second main body electrode 10121 of the second touch electrode 1012 includes a first subpart b11 and a second subpart b12, a gap is defined between the first subpart b11 and the second subpart b12, and at least part of the fourth connection electrode 10114 is disposed in the gap e between the first subpart b11 and the second subpart b12. In this way, the fourth connection electrode 10114 and the second touch electrode 1012 are prevented from being short-circuited due to contact, thereby ensuring effective transmission of the signals.

In some embodiments of the present disclosure, the first subpart b11 and the second subpart b12 are electrically connected by the bridge part b3. Besides, for the schematic diagram of electrical connection between the first subpart b11 and the second subpart b12, reference may be made to FIG. 6. For example, by replacing the third part b1 in FIG. 6 with the first subpart b11, and replacing the fourth part b12 in FIG. 6 with the second subpart b12, the schematic diagram of electrical connection between the first subpart b11 and the second subpart b12 by the bridge part b3 is obtained.

Referring to FIG. 3 and FIG. 8, one side, close to the second main body electrode 10121, of the first main body electrode 10111 is provided with a plurality of first protrusive structures f, and one side, close to the first main body electrode 10111, of the second main body electrode 10121 is provided with a plurality of second protrusive structures g. The plurality of first protrusive structures f and the plurality of second protrusive structures g are alternately arranged, and a gap is defined between the first protrusive structure f and the second protrusive structure g which are adjacent to each other (the gap is not shown in FIG. 3 or FIG. 8).

The first protrusive structures f of the first main body electrode 10111 and the second protrusive structures g of the second main body electrode 10121 are alternately arranged, which improves the mutual capacitance of the first main body electrode 10111 and the second main body electrode 10121, further improves the change in the induction amount of the touch electrode pattern 101 in the touch electrode structure 10 when the user's finger approaches the touch electrode structure 10, and is conducive to improving the touch performances of the touch panel. In addition, due to the gap between the first protrusive structure f and the second protrusive structure g which are adjacent to each other, the first touch electrode 1011 and the second touch electrode 1012 are prevented from being short-circuited due to contact.

Referring to FIG. 8 and FIG. 11, each of the touch electrode patterns 101 further includes a floating electrode 1013 disposed in the same layer as the first touch electrode 1011. The floating electrode 1013 is insulated from both the first touch electrode 1011 and the second touch electrode 1012. The floating electrode 1013 avoids the influence of a ground voltage on the signal in the first touch electrode 1011 and the signal in the second touch electrode 1012, which ensures that the detection circuit accurately determines the touch position of the user's finger.

Since the third part b1, the fourth part b2, the second branch electrodes 10122*a*, the fourth branch electrodes 10122*b*, the first connection electrode 10123 and the second connection electrode 10124 which are in the second touch electrode 1012 are also disposed in the same layer as the first touch electrode 1011, the floating electrode 1013 are also disposed in the same layer as the third part b1, the fourth part b2, the second branch electrodes 10122*a*, the fourth branch electrodes 10122*b*, the first connection electrode 10123 and the second connection electrode 10124 which are in the second touch electrode 1012. In addition, the floating electrode 1013 and the bridge part b3 in the second touch electrode 1012 are disposed in different layers.

A gap is defined between the floating electrode 1013 and the first touch electrode 1011 (the gap is not shown in FIG. 8 and FIG. 11) to insulate the floating electrode 1013 from the first touch electrode 1011. Gaps are defined between the floating electrode 1013 and the third part b1, the fourth part b2, the second branch electrodes 10122*a*, the fourth branch electrodes 10122*b*, the first connection electrode 10123 and the second connection electrode 10124 which are in the second touch electrode 1012 (the gaps are not shown in FIG. 8 and FIG. 11), such that the floating electrode 1013 is insulated from the second touch electrode 1012. Therefore, the floating electrode 1013 and the bridge part b3 are insulated only by the insulating layer 102 between floating electrode 1013 and the bridge part b3.

Figure 12:
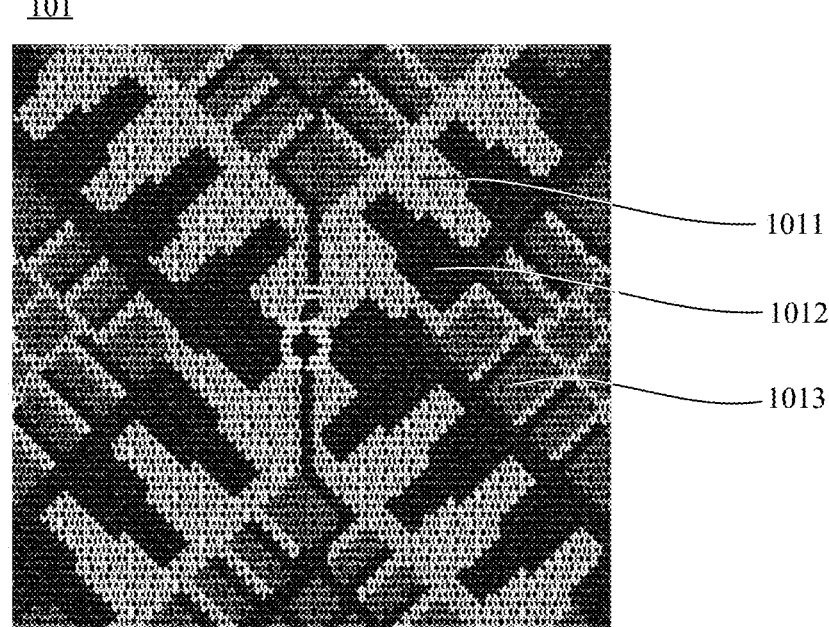
FIG. 12 is a schematic structural diagram of a touch electrode pattern according to some embodiments of the present disclosure.

Optionally, referring to FIG. 12, each structure in the touch electrode pattern 101 is a grid-like structure. For example, the first part a1 and the second part a2 of the first main body electrode 10111, the first branch electrodes 10112*a*, the second main body electrode 10121 and the second branch electrodes 10122*a* are all grid-like structures.

Figure 13:
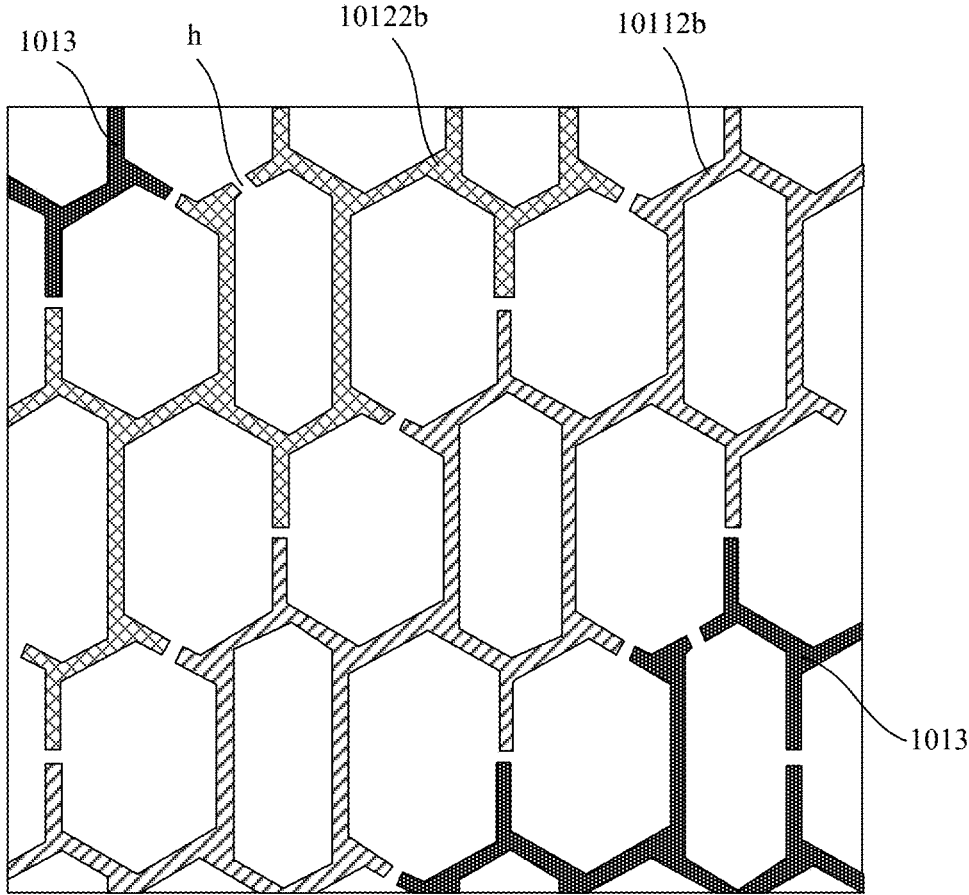
FIG. 13 is a partial schematic diagram of region C in FIG. 8.

FIG. 13 is a partial schematic diagram of region C in FIG. 8. Referring to FIG. 8 to FIG. 11 and FIG. 13, the floating electrode 1013, the third branch electrodes 10112*b* and the fourth branch electrodes 10122*b* are all grid-like structures. In addition, a gap is defined between two adjacent electrodes of the floating electrode 1013, the third branch electrodes 10112*b*, and the fourth branch electrodes 10122*b*, such that the floating electrode 1013, the third branch electrodes 10112b and the fourth branch electrodes 10122b are insulated two by two.

Figure 14:
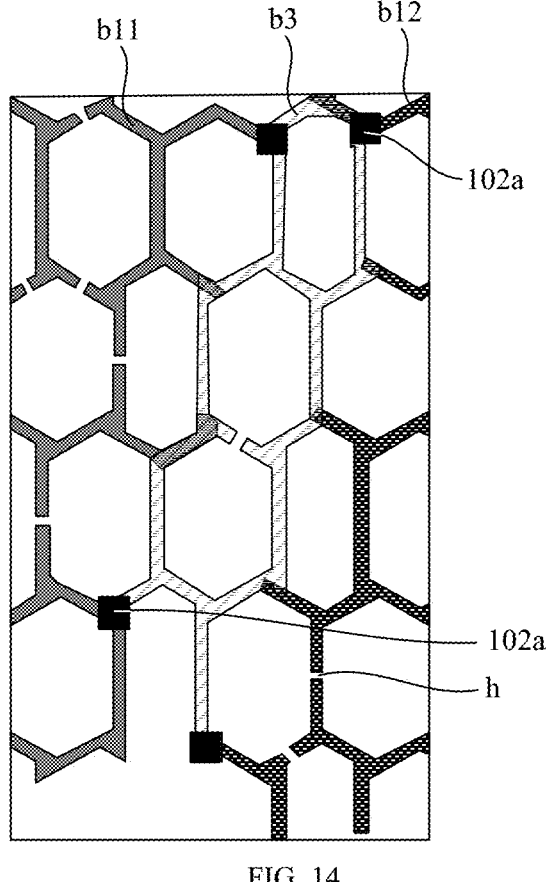
FIG. 14 is a partial schematic view of a second main body electrode of region D in FIG. 8.

FIG. 14 is a partial schematic view of the second main body electrode of the region D in FIG. 8. Referring to FIG. 8, FIG. 10, and FIG. 14, the bridge part b3 of the second main body electrode 10121, and the first subpart b11 and the second subpart b12 of the third part b1 are all grid-like structures. Additionally, a gap is defined between the first subpart b11 and the second subpart b12, the bridge part b3 and the first subpart b11 are electrically connected by the via 102a in the insulating layer between the bridge part b3 and the first subpart b11, and the bridge part b3 and the second subpart b12 are electrically connected by the via 102a in the insulating layer between the bridge part b3 and the first subpart b11.

Figures 15, 16:
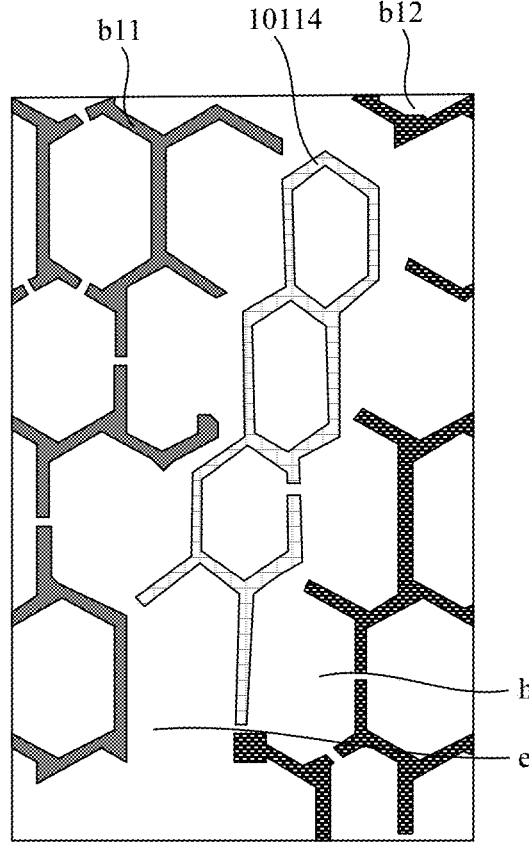
FIG. 15 is a partial schematic diagram of a first subpart, a second subpart and a fourth connection electrode of the region D in FIG. 8.
FIG. 16 is a schematic structural diagram of a touch panel according to some embodiments of the present disclosure.

FIG. 15 is a partial schematic view of the first subpart, the second subpart and the fourth connection electrode of the region D in FIG. 8. Referring to FIG. 8, FIG. 10 and FIG. 15, the fourth connection electrode 10114 of the first touch electrode 1011, and the first subpart b11 and the second subpart b12 of the third part b1 of the second touch electrode 1012 are all grid-like structures. Besides, the fourth connection electrode 10114 is disposed in the gap e between the first subpart b11 and the second subpart b12. A gap is defined between the fourth connection electrode 10114 and the first subpart b11, and a gap is defined between the fourth connection electrode 10114 and the second subpart b12 to ensure that the fourth connection electrode 10114 is insulated from the first subpart b11 and the second subpart b12.

In some embodiments of the present disclosure, grid lines of the grid-like structure have at least one fracture. By disposing the fractures, the gaps and fractures between adjacent electrodes are arranged relatively uniformly, and display uniformity of the touch panel is better.

For example, the first part a1 is provided with at least one fracture, the second part a2 is provided with at least one fracture, the first branch electrode 10112a is provided with at least one fracture, the second main body electrode 10121 is provided with at least one fracture, and the second branch electrode 10122a is provided with at least one fracture. Exemplarily, the fourth branch electrode 10122b in FIG. 13 is provided with a fracture h. In FIG. 13, each of the first subpart b11, the second subpart b12, and the bridge part b3 is provided with a fracture h.

Referring to FIG. 13 to FIG. 15, each grid formed by the grid lines of the grid-like structure in the touch electrode pattern 10 is approximately hexagonal. Each grid formed by the grid lines of the grid-like structure in the touch electrode pattern 10 is also in other shapes, which are not limited in some embodiments of the present disclosure as long as the shape of the grid formed by the grid lines of the grid-like structure is matched with the shape of a light-emitting region of each sub-pixel of a display substrate in the touch panel. Therefore, it is convenient that an orthogonal projection of the grid lines of the grid structure on the display substrate does not overlap with the light-emitting region, which avoids the influence of the grid lines of the grid structure on normal display of the display substrate.

Optionally, each of the first touch electrode 1011 and the second touch electrode 1012 is made of a metal material. Therefore, it is ensured that the first touch electrode 1011 and the second touch electrode 1012 have a signal transmission capability (i.e., conductivity). In addition, the floating electrode 1013 is also made of a metal material.

In some embodiments of the present disclosure, a simulation test is performed on capacitance change amounts in the middle region and the edge region of the touch electrode pattern in the related art, and the simulation test is also performed on the capacitance change amounts in the middle region and the edge region of the touch electrode pattern in some embodiments of the present disclosure. The edge region of the touch electrode pattern in some embodiments of the present disclosure includes a first region and a second region, and the middle region includes other regions in the touch electrode pattern other than the first region and the second region. For the test results, reference may be made to Table 1 below.

TABLE 1

| Position | Related art | | Some embodiments of the present disclosure | |
| --- | --- | --- | --- | --- |
| | Middle region | Edge region | Middle region | Edge region |
| Capacitance change amounts (fF) | 120 | 64 | 128 | 92 |

As listed in Table 1, the capacitance change amount in the middle region of the touch electrode pattern of some embodiments of the present disclosure is greater than the capacitance change amount of the middle region of the touch electrode pattern of the related art, and the capacitance change amount of the edge region of the touch electrode pattern of some embodiments of the present disclosure is greater than the capacitance change amount of the edge region of the touch electrode pattern of the related art. That is, the capacitance change amount of each region of the touch electrode pattern in some embodiments of the present disclosure is improved to a certain extent.

In addition, the increase in the capacitance change amount in the edge region is greater than the increase in the capacitance change amount in the middle region. For example, the increase (28 fF) in the capacitance change amount in the edge region accounts for 44% (about 50%) of the capacitance change amount (64 fF) in the edge region in the related art, and the increase (8 fF) in the capacitance change amount in the middle region accounts for 7% of the capacitance change amount (120 fF) in the edge region of the related art. Therefore, the touch electrode patterns in the touch electrode structure according to some embodiments of the present disclosure reduce the difference between the capacitance change amount in the middle region and the capacitance change amount in the edge region, which effectively improves the touch linearity of the touch electrode patterns.

In summary, some embodiments of the present disclosure provide a touch electrode structure. The first touch electrodes and the second touch electrodes of the touch electrode patterns of the touch electrode structure are insulated. The branch electrodes of the first touch electrode and the branch electrodes of the second touch electrode are disposed in at least one of the first region defined by the first main body electrodes of two first touch electrodes and the second region defined by the second main body electrodes of two second touch electrodes, such that the mutual capacitance of the at least one region is greater. When the user's finger approaches the at least one region, the induction amount of the touch electrode pattern changes greatly, such that the detection circuit accurately determines the touch position of the user's finger based on the greater change in the induction amount, and the touch performance of the touch panel is better.

FIG. 16 is a schematic structural diagram of a touch panel according to embodiments of the present disclosure. Referring to FIG. 16, the touch panel 01 includes a display substrate 20 and at least one touch electrode structure 10 according to the above aspect, wherein the touch electrode structure 10 is disposed on the display substrate 20.

Exemplarily, FIG. 16 shows one touch electrode structure 10, wherein the touch electrode structure 10 is disposed on one side of the display substrate 20.

The touch panel 01 includes two touch electrode structures 10 according to the above aspect. One touch electrode structure 10 is disposed on one side of the display substrate 20, and the other touch electrode structure 10 is disposed on the other side of the display substrate 20. In this case, both surfaces of the touch panel 01 achieve a touch function, that is, the touch panel 01 serves as a touch panel with double-sided touch.

Figure 17:
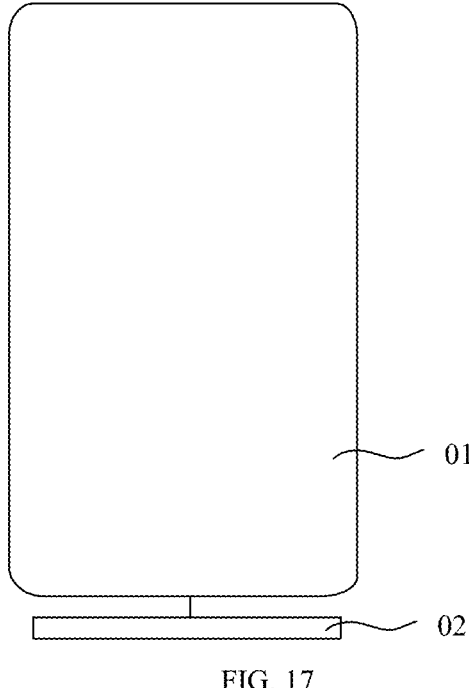
FIG. 17 is a schematic structural diagram of a display device according to some embodiments of the present disclosure.

FIG. 17 is a schematic structural diagram of a display device according to some embodiments of the present disclosure. Referring to FIG. 17, the display device includes a power supply assembly 02 and the touch panel 01 according to the above embodiment. The power supply assembly 02 is configured to supply power to the touch panel 01.

Optionally, the display device may be any product or component with a display function and a fingerprint recognition function, such as an OLED display device, a quantum dot light-emitting diode (QLED) display device, electronic paper, a mobile phone, a tablet computer, a TV, a monitor, a notebook computer, a digital photo frame, or a navigator.

Exemplarily, the display device is an active-matrix organic light-emitting diode (AMOLED) display panel.

Described above are merely exemplary some embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A touch electrode structure, comprising: a plurality of touch electrode patterns, wherein each of the touch electrode patterns comprises:

a first touch electrode, comprising a first main body electrode and branch electrodes electrically connected to the first main body electrode, wherein the first main body electrode of each of the touch electrode patterns comprises a first part and a second part which are arranged in a first direction; and a second touch electrode, insulated from the first touch electrode, and comprising a second main body electrode and branch electrodes electrically connected to the second main body electrode, wherein the second main body electrode of each of the touch electrode patterns comprises a third part and a fourth part which are arranged in a second direction, the second direction being intersected with the first direction;

wherein in two touch electrode patterns adjacent to each other in the first direction, the first part of the first main body electrode of one touch electrode pattern and the second part of the first main body electrode of another touch electrode pattern define a first region; in two touch electrode patterns adjacent to each other in the second direction, the third part of the second main body electrode of one touch electrode pattern and the fourth part of the second main body electrode of the second touch electrode of another touch electrode pattern define a second region; and at least one of the first region and the second region comprises the branch electrodes of the first touch electrode and the branch electrodes of the second touch electrode, and a gap is defined between each of the branch electrodes of the first touch electrode and each of the branch electrodes of the second touch electrode which are disposed in the same region;

the branch electrodes of the first touch electrode comprise third branch electrodes, and the branch electrodes of the second touch electrode comprise fourth branch electrodes, the third branch electrodes and the fourth branch electrodes are disposed in the second region, and a gap is defined between each of the third branch electrodes and each of the fourth branch electrodes;

an extending direction of at least part of at least one boundary of the third branch electrode is parallel to an extending direction of at least part of at least one boundary of the fourth branch electrode;

the first touch electrode further comprises a third connection electrode and a fourth connection electrode, the third connection electrode is disposed in the second region and is electrically connected to the third branch electrodes, one terminal of the fourth connection electrode is electrically connected to the third branch electrodes, and another terminal of the fourth connection electrode is electrically connected to the first main body electrode; and each of the third part and the fourth part comprises a first subpart and a second subpart, a gap being defined between the first subpart and the second subpart, and at least part of the fourth connection electrode is disposed within the gap between the first subpart and the second subpart.

2. The touch electrode structure according to claim 1, wherein the branch electrodes of the first touch electrode comprise first branch electrodes, and the branch electrodes of the second touch electrode comprise second branch electrodes;

wherein the first branch electrodes and the second branch electrodes are disposed in the first region, and a gap is defined between each of the first branch electrodes and each of the second branch electrodes.

3. The touch electrode structure according to claim 2, wherein an extending direction of at least part of at least one boundary of the first branch electrode is parallel to an extending direction of at least part of at least one boundary of the second branch electrode.

4. The touch electrode structure according to claim 2, wherein the second touch electrode further comprises a first connection electrode and a second connection electrode which are disposed in the same layer as the second branch electrodes;

the first connection electrode is disposed in the first region and is electrically connected to the second branch electrodes; and one terminal of the second connection electrode is electrically connected to the second branch electrodes, and another terminal of the second connection electrode is electrically connected to the second main body electrode.

5. The touch electrode structure according to claim 4, wherein the second main body electrode further comprises a bridge part; the first touch electrode, the third part, the fourth part, the second branch electrodes, the first connection electrode, and the second connection electrode are disposed in the same layer; and the touch electrode structure further comprises an insulating layer, wherein the insulating layer is provided with vias; and the bridge part and the third part are disposed in different layers, one terminal of the bridge part is electrically connected to the third part by the via, and another terminal of the bridge part is electrically connected to the fourth part by the via; and the another terminal of the second connection electrode is electrically connected to the third part or the fourth part by the bridge part.

6. The touch electrode structure according to claim 1, wherein one side, close to the second main body, of the first main body electrode is provided with a plurality of first protrusive structures, and one side, close to the first main body electrode, of the second main body electrode is provided with a plurality of second protrusive structures; and the plurality of first protrusive structures and the plurality of second protrusive structures are alternately arranged, and a gap is defined between the first protrusive structure and the second protrusive structure which are adjacent to each other.

7. The touch electrode structure according to claim 1, wherein each touch electrode pattern further comprises: a floating electrode disposed in the same layer as the first touch electrode; and the floating electrode is insulated from both the first touch electrode and the second touch electrode.

8. The touch electrode structure according to claim 1, wherein the branch electrodes of the first touch electrode, the first part, the second part, the branch electrodes of the second touch electrode, the third part, and the fourth part are all grid-like structures.

9. The touch electrode structure according to claim 8, wherein grid lines of the grid-like structure are provided with at least one fracture.

10. A touch panel, comprising: a display substrate and a touch electrode structure disposed on the display substrate, wherein the touch electrode structure comprises a plurality of touch electrode patterns, and each of the touch electrode patterns comprises:

a first touch electrode, comprising a first main body electrode and branch electrodes electrically connected to the first main body electrode, wherein the first main body electrode of each of the touch electrode patterns comprises a first part and a second part which are arranged in a first direction; and a second touch electrode, insulated from the first touch electrode, and comprising a second main body electrode and branch electrodes electrically connected to the second main body electrode, wherein the second main body electrode of each of the touch electrode patterns comprises a third part and a fourth part which are arranged in a second direction, the second direction being intersected with the first direction;

wherein in two touch electrode patterns adjacent to each other in the first direction, the first part of the first main body electrode of one touch electrode pattern and the second part of the first main body electrode of another touch electrode pattern define a first region; in two touch electrode patterns adjacent to each other in the second direction, the third part of the second main body electrode of the second touch electrode of one touch electrode pattern and the fourth part of the second main body electrode of the second touch electrode of another touch electrode pattern define a second region; and at least one of the first region and the second region comprises the branch electrodes of the first touch electrode and the branch electrodes of the second touch electrode, and a gap is defined between each of the branch electrodes of the first touch electrode and each of the branch electrodes of the second touch electrode which are disposed in the same region;

the branch electrodes of the first touch electrode comprise third branch electrodes, and the branch electrodes of the second touch electrode comprise fourth branch electrodes, the third branch electrodes and the fourth branch electrodes are disposed in the second region, and a gap is defined between each of the third branch electrodes and each of the fourth branch electrodes;

an extending direction of at least part of at least one boundary of the third branch electrode is parallel to an extending direction of at least part of at least one boundary of the fourth branch electrode;

the first touch electrode further comprises a third connection electrode and a fourth connection electrode, the third connection electrode is disposed in the second region and is electrically connected to the third branch electrodes, one terminal of the fourth connection electrode is electrically connected to the third branch electrodes, and another terminal of the fourth connection electrode is electrically connected to the first main body electrode; and each of the third part and the fourth part comprises a first subpart and a second subpart, a gap being defined between the first subpart and the second subpart, and at least part of the fourth connection electrode is disposed within the gap between the first subpart and the second subpart.

11. The touch panel according to claim 10, wherein the branch electrodes of the first touch electrode comprise first branch electrodes, and the branch electrodes of the second touch electrode comprise second branch electrodes;

wherein the first branch electrodes and the second branch electrodes are disposed in the first region, and a gap is defined between each of the first branch electrodes and each of the second branch electrodes.

12. The touch panel according to claim 11, wherein an extending direction of at least part of at least one boundary of the first branch electrode is parallel to an extending direction of at least part of at least one boundary of the second branch electrode.

13. The touch panel according to claim 11, wherein the second touch electrode further comprises a first connection electrode and a second connection electrode which are disposed in the same layer as the second branch electrodes;

the first connection electrode is disposed in the first region and is electrically connected to the second branch electrodes; and one terminal of the second connection electrode is electrically connected to the second branch electrodes, and another terminal of the second connection electrode is electrically connected to the second main body electrode.

14. The touch panel according to claim 13, wherein the second main body electrode further comprises a bridge part; the first touch electrode, the third part, the fourth part, the second branch electrodes, the first connection electrode, and the second connection electrode are disposed in the same layer; and the touch electrode structure further comprises an insulating layer, wherein the insulating layer is provided with vias; and the bridge part and the third part are disposed in different layers, one terminal of the bridge part is electrically connected to the third part by the via, and another terminal of the bridge part is electrically connected to the fourth part by the via.

15. The touch panel according to claim 14, wherein the another terminal of the second connection electrode is electrically connected to the third part or the fourth part by the bridge part.

16. The touch panel according to claim 10, wherein one side, close to the second main body, of the first main body electrode is provided with a plurality of first protrusive structures, and one side, close to the first main body electrode, of the second main body electrode is provided with a plurality of second protrusive structures; and the plurality of first protrusive structures and the plurality of second protrusive structures are alternately arranged, and a gap is defined between the first protrusive structure and the second protrusive structure which are adjacent to each other.

17. The touch panel according to claim 10, wherein each touch electrode pattern further comprises: a floating electrode disposed in the same layer as the first touch electrode; and the floating electrode is insulated from both the first touch electrode and the second touch electrode.

18. The touch panel according to claim 10, wherein the branch electrodes of the first touch electrode, the first part, the second part, the branch electrodes of the second touch electrode, the third part, and the fourth part are all grid-like structures.

19. A display device, comprising: a power supply assembly and a touch panel, wherein the power supply assembly is configured to supply power to the touch panel, and the touch panel comprises: a display substrate and a touch electrode structure disposed on the display substrate, wherein the touch electrode structure comprises a plurality of touch electrode patterns, and each of the touch electrode patterns comprises:

a first touch electrode, comprising a first main body electrode and branch electrodes electrically connected to the first main body electrode, wherein the first main body electrode of each of the touch electrode patterns comprises a first part and a second part which are arranged in a first direction; and a second touch electrode, insulated from the first touch electrode, and comprising a second main body electrode and branch electrodes electrically connected to the second main body electrode, wherein the second main body electrode of each of the touch electrode patterns comprises a third part and a fourth part which are arranged in a second direction, the second direction being intersected with the first direction;

wherein in two touch electrode patterns adjacent to each other in the first direction, the first part of the first main body electrode of one touch electrode pattern and the second part of the first main body electrode of another touch electrode pattern define a first region; in two touch electrode patterns adjacent to each other in the second direction, the third part of the second main body electrode of the second touch electrode of one touch electrode pattern and the fourth part of the second main body electrode of the second touch electrode of another touch electrode pattern define a second region; and at least one of the first region and the second region comprises the branch electrodes of the first touch electrode and the branch electrodes of the second touch electrode, and a gap is defined between each of the branch electrodes of the first touch electrode and each of the branch electrodes of the second touch electrode which are disposed in the same region;

the branch electrodes of the first touch electrode comprise third branch electrodes, and the branch electrodes of the second touch electrode comprise fourth branch electrodes, the third branch electrodes and the fourth branch electrodes are disposed in the second region, and a gap is defined between each of the third branch electrodes and each of the fourth branch electrodes;

an extending direction of at least part of at least one boundary of the third branch electrode is parallel to an extending direction of at least part of at least one boundary of the fourth branch electrode;

the first touch electrode further comprises a third connection electrode and a fourth connection electrode, the third connection electrode is disposed in the second region and is electrically connected to the third branch electrodes, one terminal of the fourth connection electrode is electrically connected to the third branch electrodes, and another terminal of the fourth connection electrode is electrically connected to the first main body electrode; and each of the third part and the fourth part comprises a first subpart and a second subpart, a gap being defined between the first subpart and the second subpart, and at least part of the fourth connection electrode is disposed within the gap between the first subpart and the second subpart.

* * * * *